April 27, 1954 G. C. MEREDEW 2,676,605
HYDRAULIC ACCUMULATOR AND LIKE PRESSURE STORAGE VESSEL
Filed Nov. 7, 1951 2 Sheets-Sheet 1
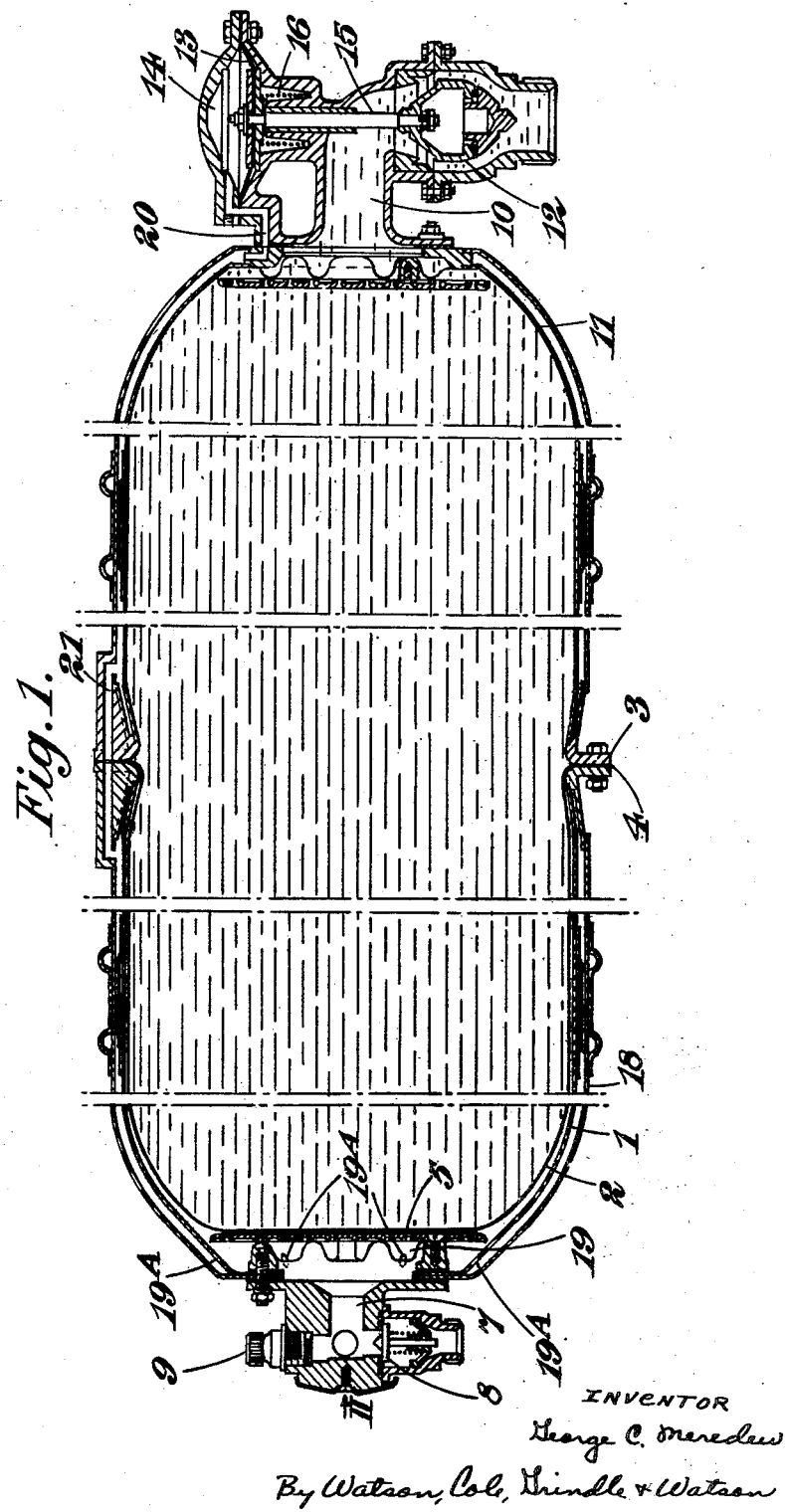

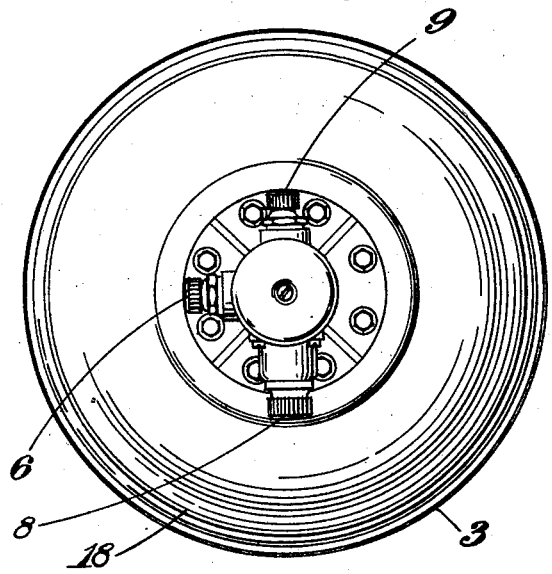

Patented Apr. 27, 1954

2,676,605

UNITED STATES PATENT OFFICE 2,676,605

HYDRAULIC ACCUMULATOR AND LIKE PRESSURE STORAGE VESSEL

George Charles Meredew, London, England

Application November 7, 1951, Serial No. 255,286

Claims priority, application Great Britain November 14, 1950

6 Claims. (Cl. 137—209)

The invention relates to hydraulic accumulators and like vessels for storing a supply of liquid under pressure and has for an object the provision of means for automatically isolating the vessel from the liquid pressure supply in the event of the vessel suffering damage such as to cause loss of liquid under pressure.

The invention is particularly, but not exclusively, concerned with accumulators (sometimes known as recuperators) employed in the fuel systems of aircraft, especially turbine-engine fighter aircraft, to maintain a supply of fuel under pressure to the engine should the main supply fail for a short period, for example due to inverted flight or manoeuvres which involve the momentary application of negative "g" to the fuel and cause the fuel to uncover the inlet to a booster pump used to pump the fuel from a main tank to the engine. Such accumulators are, as at present constructed, open to the fuel supply line between the tank and the engine without automatic shut-off means and accordingly represent a particularly vulnerable part of the aircraft because damage to the accumulator caused in combat or otherwise may result in stoppage of supply to the engine and in a loss of a large amount of fuel from the tank.

In one form of accumulator or recuperator to which the invention is especially suited for application there is a closed rigid chamber of substantial volume and a flexible bag within the chamber attached around its mouth in fluid-tight manner to the chamber around a boundary line which divides the chamber into two parts of substantially equal volume, the bag having a volume approximately equal to each such part, the arrangement being such that the bag may, by flexing about its attachment move from a position in which it constitutes a lining for one part of the chamber to a position in which it constitutes a lining for the other part and the chamber having an inlet for fuel into one part and an inlet for compressed air into the other part. In use compressed air is admitted to one part of the chamber and fuel is admitted to the other part at a pressure which is greater than that of the air so that the bag is forced into the air-containing part of the chamber and becomes substantially completely filled with fuel. In the event of failure of the fuel supply resulting in loss of pressure in the supply line the air forces the fuel out of the chamber and maintains the supply to the engine.

According to the invention an hydraulic accumulator or like vessel for storing a supply of liquid under pressure is provided with a shut-off valve for the liquid inlet, the valve being biased towards the closed position for example by the inlet pressure acting on the valve face, a jacket around the vessel or a part thereof within which air or other fluid may be maintained under pressure and means operable by the pressure in the jacket for maintaining the shut-off valve open whereby if the pressure in the jacket is lost, e. g. by damage in combat, the valve shuts and prevents flow of liquid into the vessel.

When the invention is embodied in an accumulator such as that described above in which compressed air is employed to force the liquid out of the accumulator it is a convenient arrangement to employ the compressed air also as the pressure fluid in the jacket. The jacket may be either inside or outside the main shell of the accumulator.

As an example of the invention a specific construction of an accumulator or recuperator for use in a fighter aircraft fuel system will now be described with reference to the drawings which show in Figure 1 a longitudinal section through the accumulator and in Figure 2 an end view in the direction of the arrow in Figure 1.

In this example the accumulator is of the kind described above having a rigid vessel or chamber 1 and a flexible bag 2 therein. The chamber is of generally cylindrical form domed at its two ends. The chamber is constructed of two similar parts secured together by a circumferential joint 3 central in the length of the chamber. The mouth 4 of the bag is clamped within the joint to form the attachment of the bag to the chamber. At one end of the chamber there is a perforated plate 5 constituting an air inlet and there is an attachment 6 for an air supply pipe leading to the passageway 7. There is also a pressure relief valve 8 and a connection 9 for a pressure gauge or drain cock. In use air at a substantially constant pressure is supplied through the air supply pipe. At the other end of the chamber there is a fuel inlet and outlet 10 covered by a perforated plate 11. Within the inlet there is a mushroom valve 12 arranged to close in the direction of flow of fuel into the chamber so that the fuel pressure tends to close the valve. There is also a diaphragm 13 and chamber 14 of which the diaphragm is attached to the valve stem 15 and is so arranged that pressure in the chamber tends to hold the valve open. As a further means for ensuring closure of the valve when required there is a light spring 16 between the underside of the diaphragm and an abutment surface on the valve housing.

Completely surrounding the main chamber there is an outer skin 18 which is spaced a small distance from the chamber to form a jacket. This jacket is open to the supply of compressed air through ports 19 and holes 19A and is also open to the diaphragm chamber through passageways 20. A passageway 21 connects the two ends of the jacket around the joint 3.

In use compressed air is admitted to the main chamber through the supply pipe, to the jacket and to the diaphragm chamber thereby causing the valve to open and pressure to be applied, through the material of the bag, to fuel which is admitted to the other end of the chamber. The normal fuel pressure is greater than at of the air so that the chamber fills substantially completely with fuel. If the accumulator suffers damage such as to cause loss of air pressure in the jacket and leakage of fuel the valve closes automatically under the action of the spring and the pressure in the supply line. Consequently the accumulator is then isolated from the supply line.

The detailed constructional features of the above example may be modified. For instance the chamber may be of any convenient shape, e. g. of spherical form. Again although the most economical arrangement is one in which, as described above, the chamber is divided into parts of equal volume and the bag has a volume equal to one of these parts, this arrangement may be modified if desired for example so that the bag does not completely fill one or other of the two parts.

I claim:

1. An hydraulic accumulator for storing a supply of liquid under pressure, comprising a closed vessel with inlet and outlet connections for the liquid, a valve controlling the inlet to the vessel and arranged to be biased towards the closed position in use, a jacket around at least a major part of the vessel and within which a fluid may be maintained under pressure and means operable by pressure in the jacket for maintaining the shut-off valve open, whereby if the pressure in the jacket is lost the valve shuts and prevents flow of liquid into the vessel.

2. An hydraulic accumulator as claimed in claim 1 in which the valve is arranged to be biased as aforesaid by the inlet pressure of the liquid.

3. An hydraulic accumulator as claimed in claim 1 arranged to employ compressed air to maintain the pressure on the supply of liquid and including connections whereby the compressed air is also admitted to the jacket to constitute the fluid aforesaid.

4. An hydraulic accumulator as claimed in claim 3 in which the means for maintaining the valve open comprise a diaphragm and chamber operatively connected to the valve and in which connections are provided between the jacket and the chamber.

5. An hydraulic accumulator for storing a supply of liquid under pressure, comprising a closed vessel, a flexible bag within the vessel and secured by its mouth to the walls thereof so as to divide the vessel into two parts, an inlet and outlet connection for the liquid to one part of the vessel, a valve controlling the inlet to the vessel and arranged to be biased towards the closed position in use, fluid pressure operated means for maintaining the valve open, a jacket around at least a major portion of the vessel and within which a fluid may be maintained under pressure and connections between the jacket, the other part of the vessel and the fluid pressure operated means whereby fluid pressure from a common source may be employed to maintain the supply pressure on the liquid, to maintain the valve open and to maintain pressure on the jacket and whereby if the pressure in the jacket is lost the valve shuts and prevents flow of liquid into the vessel.

6. An hydraulic accumulator as claimed in claim 5 in which the jacket is on the outside of the vessel.

References Cited in the file of this patent

UNITED STATES PATENTS

| Number | Name | Date |
| --- | --- | --- |
| 2,080,485 | Johnsen | May 18, 1937 |
| 2,385,016 | Mercier | Sept. 18, 1945 |
| 2,472,070 | Garretson | June 7, 1949 |
| 2,532,143 | Breit | Nov. 28, 1950 |
| 2,550,892 | Weber et al. | May 1, 1951 |